United States Patent [19]

Dale

[11] 4,395,959

[45] Aug. 2, 1983

[54] HAND APPARATUS FOR CONTINUOUS INJECTION OF CHEMICALLY-IMPREGNATED FILAMENT

[75] Inventor: Jim E. Dale, Greenville, Miss.

[73] Assignee: The United States of America as represented by the Secretary of Agriculture, Washington, D.C.

[21] Appl. No.: 311,587

[22] Filed: Oct. 15, 1981

[51] Int. Cl.³ .............................................. A01C 23/02
[52] U.S. Cl. ..................................... 111/7.2; 47/48.5; 47/56; 405/183
[58] Field of Search ...................... 47/48.5, 56, 1.5, 9; 111/7.1, 7.2, 7.3, 7.4; 239/44, 145, 38, 48; 405/180, 183, 184, 174, 176; 172/438; 71/65, 79, DIG. 1; 118/404, 420

[56] References Cited

U.S. PATENT DOCUMENTS

| | | | |
|---|---|---|---|
| 1,624,474 | 2/1926 | Clipperton | 111/7 |
| 1,764,952 | 8/1929 | Hay | 47/1.5 |
| 2,047,089 | 6/1934 | Turner | 239/48 |
| 3,059,437 | 7/1959 | Jennings et al. | 405/183 |
| 3,065,605 | 11/1962 | Zitko | 405/176 |
| 3,864,114 | 2/1975 | Green | 47/1.5 |
| 4,187,638 | 2/1980 | Hardy et al. | 47/1.5 |
| 4,219,964 | 9/1980 | Dale | 47/1.5 |

FOREIGN PATENT DOCUMENTS

| | | | |
|---|---|---|---|
| 826516 | 3/1952 | Fed. Rep. of Germany | 47/56 |
| 2302017 | 10/1976 | France | 47/56 |

*Primary Examiner*—James R. Feyrer
*Assistant Examiner*—Danton DeMille
*Attorney, Agent, or Firm*—M. Howard Silverstein; David G. McConnell; Raymond C. Von Bodungen

[57] ABSTRACT

A new apparatus for the application of liquid chemicals to soil is disclosed. A hand tool opens a slit in the soil by means of an injector blade and places a chemical-laden filament in the slit. The chemical-laden filament is dispensed from a floating spool in a fluid reservoir, through a conduit and to the soil. A handle provides both support for the reservoir and the injector knife as well as a working means for opening the soil.

2 Claims, 2 Drawing Figures

HAND APPARATUS FOR CONTINUOUS INJECTION OF CHEMICALLY-IMPREGNATED FILAMENT

BACKGROUND OF THE INVENTION (1) Field of the Invention

This invention relates to an apparatus which continuously applies an agricultural chemically-impregnated chemical filament to soil.

(2) Description of the Prior Art

Herbicides are usually applied as sprays in water or oil, or as dry granules. A system of applying liquid chemicals to the tops of plants by rope wicks was recently developed, but herbicides are basically applied by spraying over the top of plants or under the plant canopy toward the base of crop plants. When herbicides are sprayed on the soil before planting and emergence of crop plants, they may be either left on the soil surface or physically incorporated into the soil. Their characteristic phytotoxic properties may be altered by surfactants, such as sticking and wetting agents, added to their formulations or spray solutions, or by the kind of formulation used, such as granular formulation in place of emulsifiable concentrate. Other techniques that are known but seldom used in the art of applying herbicides include the injection of liquid or gaseous formulations directly into the soil (with or without the use of an impervious shield such as a plastic sheet to retain the vapors in the soil) and the use of bars of wax containing the herbicide to rub over the tops of weeds.

Hardy (U.S. Pat. No. 4,187,638) and Dale (U.S. Pat. No. 4,219,964) relate to application of liquid chemicals by rubbing foilage and tops of plants with segments of chemical-soaked rope carried from plant-to-plant but germinating seed, plant roots, and shorter plants cannot be treated by this means due to their location in or near the soil.

Green (U.S. Pat. No. 3,864,142) relates chemical-impregnated fabrics for laying on the soil surface, but this means is seldom used since effectiveness of chemicals applied in this manner deteriorates rapidly under the influence of sun, wind, and rain.

Zitko (U.S. Pat. No. 3,065,605), Brugel (German Pat. No. 826,516), and Crepet (French Pat. No. 2,302,017), relate means of placement of seed-affixed tapes in soil with massive machines having a multiple of moving parts, and power-driven gears and press-wheels. Although application of agricultural chemicals by this means is conceivable, costs are prohibitive even where the machines are available, and for gardners and small, non-mechanized farmers whose agronomic practices depend largely on the use of hand tools, the required mechanization is unacceptable. None of the prior art teaches technology similary to the instant invention.

SUMMARY OF THE INVENTION

The instant invention embodies a dispenser of chemical-laden filament for the precise placement of predetermined amounts of agricultural chemicals in soil. Filament is immersed in a reservoir of liquid chemical solution. As the filament is dispensed from the reservoir and directed to the soil, the soil is opened with a cutting means to provide for the filament. A handle or support means is provided to act in supporting the reservoir and cutting means as well as a working means for thrusting the cutting means into the soil and pulling the cutting means forward to open the soil.

The herbicide solution imbibed in the filament is conveyed with the filament. The amount or rate of chemical applied is controlled by the concentration in the reservoir, by the size and kind of filament, and by the number or length of filaments placed in the soil. The effect of the chemical on crop plants can also be regulated somewhat by the distance from the plant to where the filament is implanted. The instant invention is unique in that a filament is used to convey predetermined amounts of chemical solution from the reservoir and place it in the soil. Placement of chemicals is more precise than is possible with any method of spraying and incorporating chemicals in soil. Air currents do not influence the distribution of the chemical or cause drift. Polluting chemicals are not sprayed into the air. Power driven mechanical systems to dispense the filament or accurately meter the amount of chemical being applied are not needed, and adjustments of pressure and speed of movement across the field are not required to calibrate the instant applicator of agricultural chemicals.

DESCRIPTION OF THE PREFERRED EMBODIMENTS

In referring to the preferred embodiments of the invention illustrated, specific terminology will be resorted to for the sake of clarity. However, it is not intended to be limited to the specific terms so selected, and it is understood that each specific term includes all technical equivalents which operate in a similar manner to accomplish a similar purpose. Component parts of the instant invention may be made of any material. But it is required that materials must be compatible with the agricultural chemicals used and be able to withstand shock encountered in penetrating and opening of slits of field soils. It is understood that the instant invention may be operated by hand or attached to a power source. However, applicant describes a hand application for purposes of the embodiment.

Figure 1:
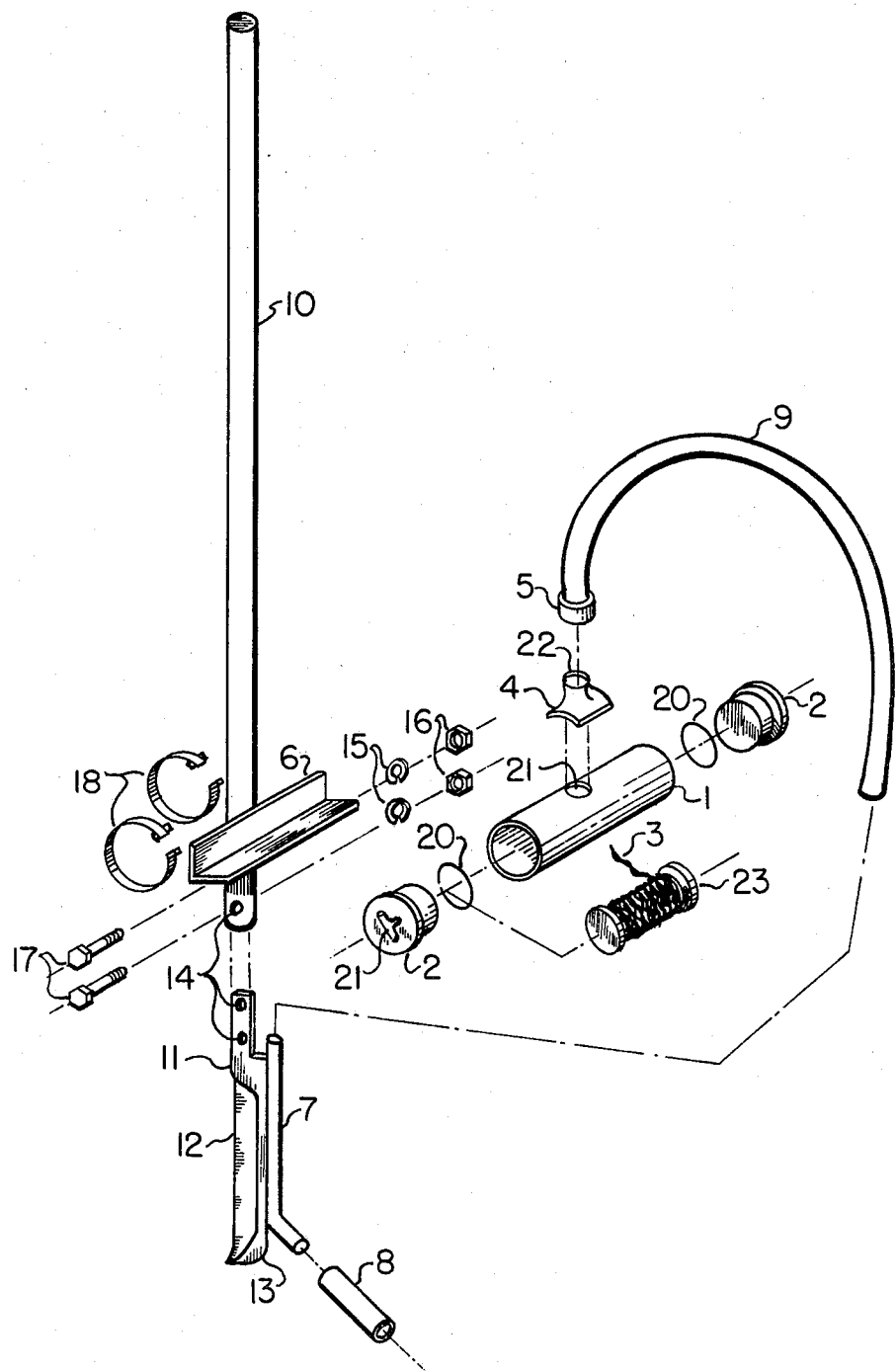
FIG. 1 is a side exploded view showing the salient component parts in relation to each other as typically assembled.
Figure 2:
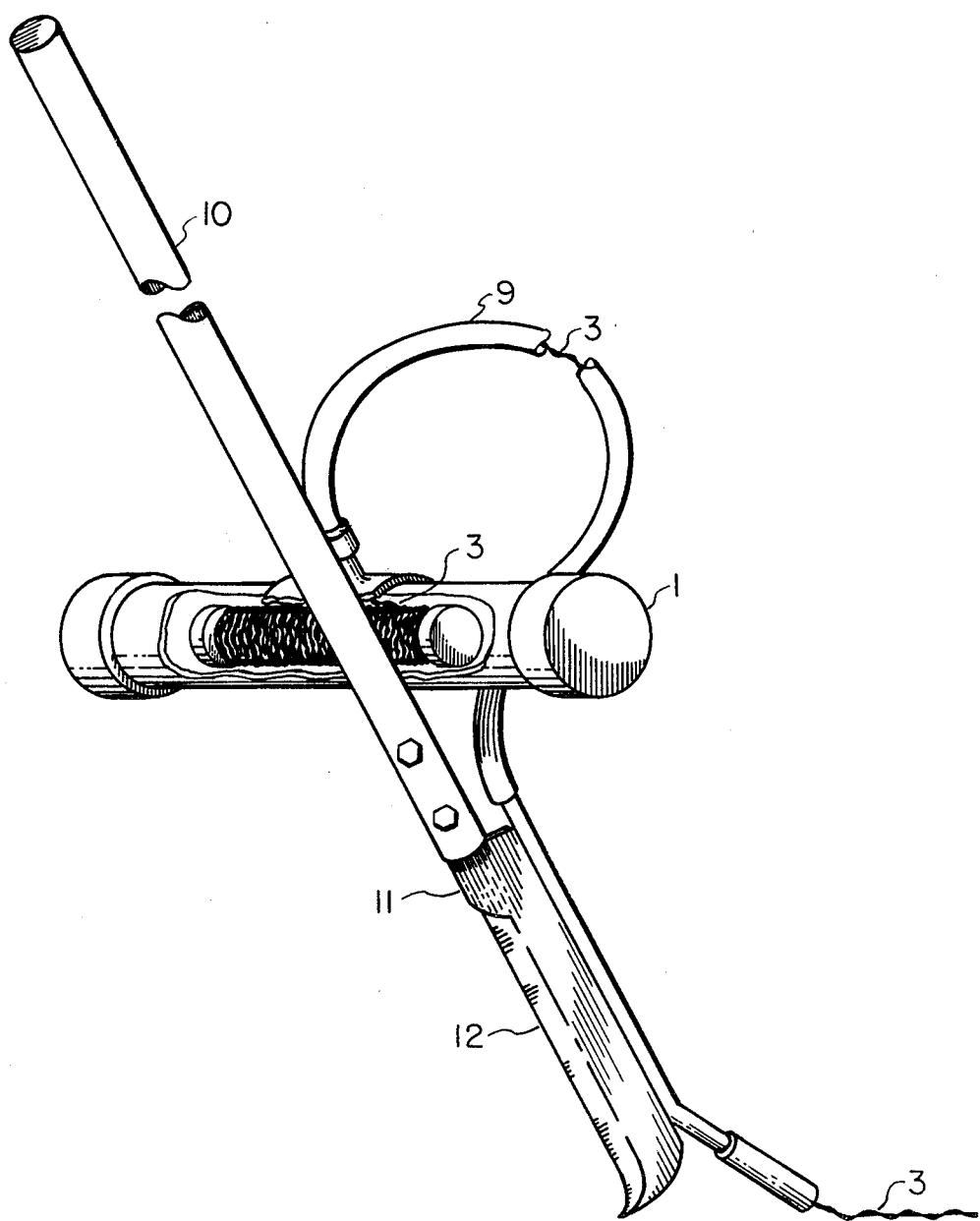
FIG. 2. is a perspective side view showing the fully assembled apparatus.

Reference is made to FIGS. 1 and 2 wherein liquid agricultural chemicals are incorporated into soil by a cutting means which is thrusting knife 11 into the soil and moving the invention forward by hand so that leading sharpened edge 12 of injector knife 11 opens a slit in soil and filament 3 ladened with agricultural chemical (not shown) is deposited at the bottom of the slit through tube 7 and trailer hose 8 attached to a blunt trailing edge 13 of injector knife 11.

A fully assembled embodiment shown in FIG. 2 consists of the following critical parts: a fluid reservoir 1 which contains a liquid agricultural chemical (not shown) and a spool of filament 3, an injector knife 11, a conduit or plastic tube 9 through which the filament is passed as it is conveyed to the soil, and a handle 10 which serves for support and attachment of fluid reservoir 1, and injector knife 11, and for manipulation and carrying the invention in the field. The means whereby the critical parts are attached to one another is not critical, and size, shape, and positioning of component parts will be determined by the purpose to which the instant invention is applied.

Assembly of the embodiment shown in FIG. 2 is explained by referring to the exploded side view in FIG. 1. Fluid reservoir 1 is a cylindrical hollow chamber made of thick-walled polyvinylchloride plastic (PVC) pipe with openings 2 at each end and a circular opening located on the top side of fluid reservoir 1. Closure 2 can be made of any material. A rubber seal plug 20 is pushed inside open ends 2 of fluid reservoir 1 and tightened in place by turning handle 21 of ends 2 which causes rubber seal plug 20 to expand and press against the inside wall of fluid reservoir 1, thereby forming a seal that prevents leakage of agricultural chemical from fluid reservoir 1. Riser fitting 4 is positioned and aligned over hole 21 at the top of fluid reservoir 1 and attached to it so that hole 22 through riser fitting 4 is aligned with hole 21 of fluid reservoir 1. The upper end of hose 9 is attached to riser fitting 4 by screwing hose fitting 5 onto threads of riser fitting 4. The lower end of hose 9 is slipped over upper end of guide tube 7. Guide tube 7 is positioned and aligned longitudinally against dull trailing edge 13 of injector knife 11. In the instant invention guide tube 7 was welded to trailing edge 13, of injector knife 11. Although means of securing guide tube 7 is not critical, guide tube 7 and trailing hose 8 attached to lower end of guide tube 7 must follow in the vertical plane of the slit opened by injector knife 11 as knife 11 is moved forward in the direction of the sharpened leading edge 12 in order to place chemical-laden filament 3 in the bottom of the slit. Guide tube 7 is bent backward approximately 45° at its lower end and trailing hose 8 is placed on this end of guide tube 7 to prevent soil from clogging the opening through which chemical-laden filament 3 passes. Injector knife 11 and guide tube 7 are made of steel because the material is rigid, resists abrasion, and holds its sharp cutting edge when passed through soil. Fluid reservoir 1 and injector knife 11 are both attached to handle 10. In the embodiment shown in FIGS. 1 and 2, handle 10 was made of thick-walled aluminum pipe 1-inch in diameter and 44 inches long for the sake of strength, balance, and ease in handling the hand tool but can be of any compatible material. The steel blade of injector knife 11 is 12-inches long, 3/16-inch thick, and 1¼-inches broad, and strong enough to be used in soil without bending or breaking. Injector knife 11 is attached to handle 10 with bolts 17, lock washers 15, and nuts 16 at its upper end. Bracket 6 used to hold fluid reservoir 1 is welded to handle 10 approximately 4 inches from lower end of handle 10 and is attached horizontally to vertical handle 10 in the working position. Removal clamps 18 that hold fluid reservoir 1 in position on handle 10 are used to permit exchanging reservoirs when different agricultural chemicals are applied with the same tool. Fluid reservoir 1 of the embodiment shown in FIGS. 1 and 2 has an internal chamber and a hollow, floating, plastic spool 23 of filament which is placed inside the chamber of reservoir 1. Floating spool 23 permits easy dispensing of string from the small confined fluid reservoir without backlash and binding encountered when fixed or stationary spools are used. Spool 23 serves as a support and a dispensing means for filament 3. Conduit or plastic hose 9, tube 7 and trailer hose 8 serve as a means of directing filament 3 from the fluid reservoir 1 to the soil.

Filament 3 may be of cotton, rayon, nylon, twisted paper, etc. It must be of sufficient size and absorbancy to carry the required amount of chemical solution and of sufficient strength that breakage does not occur as the string is dispensed. Biodegradable string may be desirable in certain instances. In the instant invention the string material is, e.g., that manufactured by Wellington Puritan Mills, Inc., Madison, Ga., and described as being nylon seine twine, twisted, G-4112Tooo4, Catalog Number 10466, size number 12, preshrunk, 100% nylon filament, resistant to oil, mildew, and most chemicals. In the instant example the nylon string wetted rapidly, and the quantity of chemical dispensed was reproducible and proportional to the length of filament removed over a wide range of concentrations of chemical solution.

The embodiment is described in FIGS. 1 and 2, for a typical application of an agricultural chemical to control weeds in a crop row would be used as a hand tool by a workman on foot. In operation to fill fluid reservoir 1 of the fully assembled invention with spool 23 and filament 3 and an agricultural liquid chemical (not shown), the hand tool is picked up, tilted somewhat toward a side position, and a closure 2 is removed from one end of fluid reservoir 1. Hose fitting 5 is also unscrewed from riser fitting 4. Spool 23 with string 3 wound thereon is placed into the internal chamber of fluid reservoir 1, and one end of filament 3 pulled through an opening in riser fitting 4. A small weight (not shown), is attached to the end of filament 3 and dropped through hose 9, guide tube 7, and trailer hose 8 to pull the end of filament 3 through an opening at the lower end of trailer hose 8. Closure 2 is replaced in the end of fluid reservoir 1 and handle 21 of closure 2 is turned until rubber plug 20 of closure 2 reseals the end opening. The tool is turned so that open riser fitting 4 is located on the top side of fluid reservoir 1. Fluid reservoir 1 containing spool 23 and filament 3 is then filled approximately half full by pouring a solution of an agricultural chemical herbicide, e.g. 2.5 percent (v/v) aqueoussolution of s-ethyl dipropylthiocarbamate (EPTC) into fluid reservoir 1 through open riser fitting 4. Hose fitting 5 is then screwed on riser fitting 4 and tightened firmly. At this point, spool filament 3 is floating partially submerged in herbicide solution inside fluid reservoir 1, and one continuous length of string extends through the connected openings of riser fitting 4, hose fitting 5, guide tube 7, and trailer hose 8 which now form a series of connecting tubes from fluid reservoir 1 to the lower end of trailer hose 8. Ordinarily filament 3 inside fluid reservoir 1 will become imbibed with the chemical solution in 2 to 5 minutes. In operation a worker would pull the loose end of filament 3 through the series of tubes to expose wetted filament 3 at the lower open end of trailer hose 8. With the tool in a nearly upright position (as shown in FIG. 2), a worker (not shown) would then push the lower tip of injector knife 11 into the soil to the desired depth, usually 1 to 2 inches, using handle 10 and begin to move knife 11 forward in the direction of sharp leading edge 12. Trailing end 13 and trailer hose 8 would follow in the slit opened in the soil as injector knif 11 is moved forward, and filament 3 is deposited in a slit behind trailer hose 8. The worker would then pack soil over the end of filament 3 to hold it in place where the slit was begun. Then, with the loose end of filament 3 secured in place, the worker would use handle 10 to push and guide injector knife 11 forward along a row to place herbicide ladened filament 3 in or beside a row either before or after planting and/or establishment of plants. Soil would then be filled into the slit to cover the implanted, herbicide-ladened filament 3. Handle 10 can be secured to knife 11 as desired but in the instant invention bolts 17 were inserted through holes 14 and secured by nuts 15. Lock nuts 16 are provided if desired.

The agricultural chemical may be any such chemical which is applicable to soil or to plants through contact with adjacent soil. Typical chemicals include growth regulators, e.g. naphthaleneacetic acid; insecticides, e.g. diazinon; fungicides, e.g. pentachloronitrobenzene, zineb, thiram, captan and chloranil; nematocides, e.g. ethylene dibromide; herbicides, e.g. trifluralin and vernolate; fertilizers, e.g. NKP, iron, sulfur, magnesium and micronutrients; miticides, e.g. chlorobenzilate and rodenticides, e.g. rotenone. The solvent must naturally be agriculturally acceptable.

The agricultural chemical is conveniently dissolved in a suitable agriculturally-acceptable solvent, preferably water. The resulting solution may be varied from one which is extremely dilute, e.g. about one percent, to one which is 25 percent (v/v) or even higher. In addition to water, typical solvents may include, e.g., isopropyl alcohol, toluene, xylene, aromatic oils, alkylated naphthalenes, and petroleum oil.

The rate of exhaustion of the agricultural chemical from the string to surrounding soil depends on the concentration of the chemical in the string, water-solubility of the chemical, soil and weather conditions.

I claim:

1. A hand operated apparatus for continuously injecting a chemically-impregnated filament into the soil comprising in combination the following:
   (a) a fluid reservoir containing an agricultural chemical therein;
   (b) a chemically-impregnated filament wound around a hollow floating spool located within the reservoir, said hollow floating spool supported by means of floating on the agricultural chemical and said filament chemically-impregnated by means of absorbing the agricultural chemical in the fluid reservoir, said filament wound hollow floating spool used to dispense the chemically-impregnated filament to soil;
   (c) a vertical handle to which said fluid reservoir is attached, said vertical handle for support and thrusting said apparatus into the soil;
   (d) an injector knife affixed to the lower end of the vertical handle, said injector knife having a sharp edge to open soil when the hand apparatus is pulled forward;
   (e) a conduit affixed at one end to an upper end of the fluid reservoir and attached at the middle to the trailing edge of the cutting means, said conduit opened to the soil on the lower end so that said conduit forms a means for directing and dispensing the chemically impregnated filament from the floating spool in the fluid reservoir into the soil as the hand apparatus is pulled forward.

2. The apparatus of claim 1 including removable access and covers on the fluid reservoir; and wherein the conduit is a plastic tube.

* * * * *